United States Patent
Chesters

(10) Patent No.: US 7,334,596 B1
(45) Date of Patent: Feb. 26, 2008

(54) PENDULOUS CONTROL VALVE SYSTEM

(76) Inventor: Thomas Peter Chesters, 1901 Marigold La., Hanover Park, IL (US) 60133

( * ) Notice: Subject to any disclaimer, the term of this patent is extended or adjusted under 35 U.S.C. 154(b) by 275 days.

(21) Appl. No.: 11/321,932

(22) Filed: Dec. 29, 2005

(51) Int. Cl.
*F16K 17/36* (2006.01)

(52) U.S. Cl. .............................. 137/38; 137/43; 137/45

(58) Field of Classification Search .................. 137/38, 137/43, 45, 533.13; 359/233, 236
See application file for complete search history.

(56) References Cited

U.S. PATENT DOCUMENTS

| | | | | |
|---|---|---|---|---|
| 229,094 A | * | 6/1880 | Clements | ................ 137/533.13 |
| 1,908,762 A | * | 5/1933 | Johnston et al. | ............... 137/45 |
| 2,082,723 A | * | 6/1937 | Seward, Jr. | ................... 137/45 |
| 2,474,677 A | * | 6/1949 | Kirkland | ..................... 359/236 |
| 4,469,116 A | | 9/1984 | Hansen | |
| 5,282,496 A | * | 2/1994 | Kerger | ......................... 141/18 |
| 6,904,943 B2 | | 6/2005 | Dennis | |

\* cited by examiner

*Primary Examiner*—Stephen M. Hepperle

(57) ABSTRACT

A housing containing a rotatable cage for rotatably supporting a spherical flow control valve having a vertically orientated open or filled conduit and an internal bottom weight mass centered on the vertical conduit. If the rotatable cage is tilted, the gravity-responsive bottom weight mass rotatably maintains the control valve conduit in a vertical orientation. If the cage is walled, the rotating cage wall will travel over the ends of an open conduit to form a seal, which effectively occludes any gas, liquid or electromagnetic beam flowing through the conduit. If the cage is open and rotatably supports the valve via annular supports, the rotating cage will interrupt an electromagnetic beam or electric current flow through the control valve conduit. The flow control valve may also have an extended open or filled conduit which may be provided with an additional weight mass, or a magnetic mass associated with a locking ring.

14 Claims, 1 Drawing Sheet

PENDULOUS CONTROL VALVE SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of the Invention

The invention relates to flow control valves for low pressure, small scale applications, and particularly to a type of valve responsive to displacement from an upright orientation to occlude or interrupt a flow.

2. Description of Prior Art

A Pendulous Control Valve System of the type under consideration for relatively low pressure, small-scale applications, uses a caged rotatable ball valve having internal gravity responsive masses and a vertically orientated axial conduit for flow control. The control valve may be employed within a variety of flow applications that require a tilt-responsive on-off switching mechanism for allowing or preventing the flow of a low pressure gas or liquid, for example, for use in a diving or floating snorkel application as opposed to, say, an air pump application, or for use in a small water container application as opposed to a plumbing application. In alternate embodiments, a Pendulous Control Valve System can be utilized to allow or interrupt the flow of an electromagnetic beam, for example, for use in a simple motion detector or plumb line application as opposed to, say, a missile guidance application. In another alternate embodiment, a Pendulous Control Valve System can be utilized to allow or interrupt the flow of an electrical current, for example, for use in a floor lamp tip-over application, as opposed to, say, an electrical distribution application.

Gravity responsive, rotatable ball valves with a vertically orientated axial channel are well known in the prior art, for example U.S. Pat. No. 2,082,723 to Seward, "Liquid Level Indicator and Level Therefor" discloses a gas and liquid flow control ball valve which uses a universal mount for a ball valve having a vertical inlet and an inverted-V dual outlet method. Or for example, U.S. Pat. No. 4,469,116 to Hansen, "Valve Device for the Prevention of the Overfilling of Portable Containers, Particularly Gas Cylinders" discloses a gas or liquid flow valve which utilizes a ball valve with a vertical conduit which is freely rotatable relative to the spherical interior of a support member. Or, for example, U.S. Pat. No. 6,904,943 B2 to Dennis, "Articulated Fuel Container Vent System and Method," discloses a fuel vapor flow valve within a fuel container that utilizes a ball valve with a pendulous vent tube as a vapor venting means.

None of the cited references address the issues of providing a universally applicable tilt-valve system for gas and liquid that is easily modified for use with the flow of electromagnetic beams or electric current. There is also no suggestion or speculation in any of the three cited patent specifications that their respective valve systems could or should be utilized in the overall manner of any embodiment of the Pendulous Control Valve System under consideration.

SUMMARY

A housing containing a rotatable cage for rotatably supporting a spherical flow control valve typically having a vertically orientated open or filled conduit and an internal bottom weight mass centered on the vertical conduit. If the rotatable cage is tilted, the gravity-responsive bottom weight mass rotatably maintains the control valve conduit in a vertical orientation. If the cage is walled, the rotating cage wall will travel over the ends of an open conduit to form a seal, which effectively occludes any gas or liquid or electromagnetic beam flowing through the conduit. If the cage is open and rotatably supports the valve via annular supports, the rotating cage will effectively interrupt an electromagnetic beam or electric current flow through the control valve conduit. The flow control valve may also have a downwardly extended open or filled pendulous conduit which may be provided with an additional weight mass.

Alternately, a pendulum with an open or filled conduit may have a magnetic weight mass which can be captured by a provided lower metal ring to lock the control valve system in an off position until the magnetic lock is released. A locking ring may be alternately provided with a solenoid-operated release mechanism for remote unlocking and resetting purposes. The invention may further have a secondary electrically operated power-disconnect system, which serves to shut down the overall flow system when the control valve conduit is occluded or interrupted.

OBJECTS AND ADVANTAGES

The primary object of the invention of a Pendulous Control Valve System is to provide a rotatably supported flow control valve that immediately closes in response to a predetermined tilt angle of its cage enclosure. It is a further object of the invention to provide a flow control valve that may be easily modified for a variety of applications to serve as a tilt valve for respectively occluding the flow of a gas or liquid, or to interrupt the passage of a light beam or an electric current.

It is a still further object of the invention to provide a rotatable spherical valve with an axial conduit and an internal bottom weight mass so that the valve will remain in or restore itself to a gravity referenced vertical orientation and to occlude or interrupt any flow through the conduit during any relevant rotational displacement from vertical. It is also an object of the invention to provide a secondary, electrically operated power-disconnect system for a control valve application, when required, which serves to shut down the overall power source of the flow system application when a control valve conduit is occluded or interrupted.

An example of an object of a Pendulous Control Valve System being utilized as a low pressure gas flow control valve in a larger order, but still small scale application, would be for use with diving or float suspended snorkels to prevent the introduction of water into the air intake of a snorkel by closing the air intake as the snorkeler tilts the snorkel to dive. An example of an object of a Pendulous Control Valve System being utilized in a larger order, but still small scale application as a liquid control flow valve would be as a shut-off valve in a portable water supply system which overturns. An example of an object of a Pendulous Control Valve System utilized as an electric current flow control valve in a larger order, but still small scale application, would as a shut-off switch for a floor lamp which overturns. An example of an object of a Pendulous Control Valve System utilized as an electromagnetic beam flow control valve in a larger order, but still small scale application, would be as a beam interrupter for a photocell in an alarm system.

It is still a further object of this invention to provide a Pendulous Control Valve System that serves the above listed purposes and other similar purposes, and is also relatively simple to manufacture and to use, reliable during use, durable, and fabricated from inexpensive, commonly available materials.

The primary advantage of a Pendulous Control Valve System is that it combines a number of possible functional features and abilities in one relatively compact and simple device, all of which possible functional features and abilities are useful in association with practical activities. A further advantage is that a Pendulous Control Valve System provides a flow control valve that immediately closes in response to a predetermined angular tilting of its enclosure in any direction. It is a also a further advantage of the invention that it provides a simple flow control valve which may be respectively utilized to interrupt the flow of a gas or a liquid, or to interrupt the passage of an electromagnetic beam or an electric current.

There is a clear need for a Pendulous Control Valve System for low pressure, small scale applications, which is durable, simple to use, reliable during use, and which is fabricated from inexpensive commonly available materials and components, and which is relatively easy to manufacture, maintain, and repair. Other objects and advantages of the invention will become clear upon review of the following detailed description and accompanying drawings.

DESCRIPTION AND OPERATION

Figure 1:
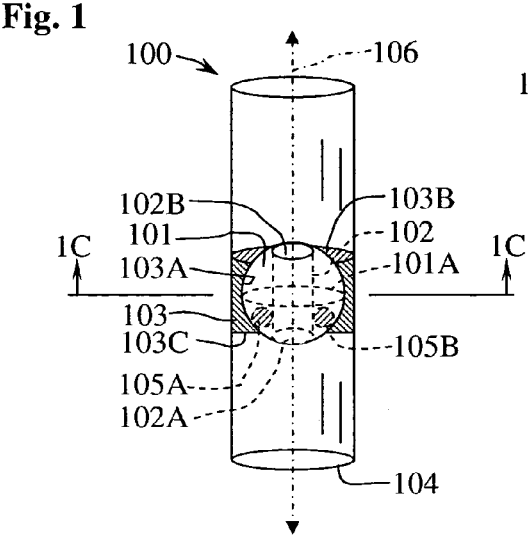
FIG. 1 is a diagrammatic cutaway perspective view of a vertically orientated pendulous flow control valve system having a rotatable weighted control valve and a tubular conduit.
Figure 1A:
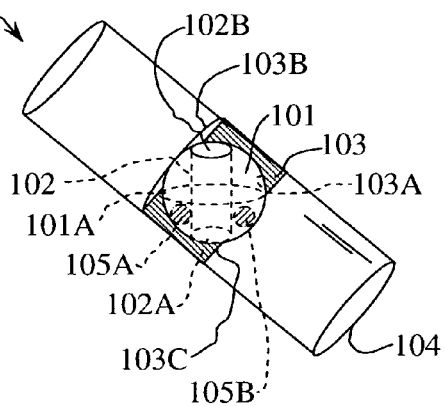
FIG. 1A is a diagrammatic cutaway perspective view of the flow control valve system of FIG. 1 showing a left tilted, partially closed tubular conduit.
Figure 1B:
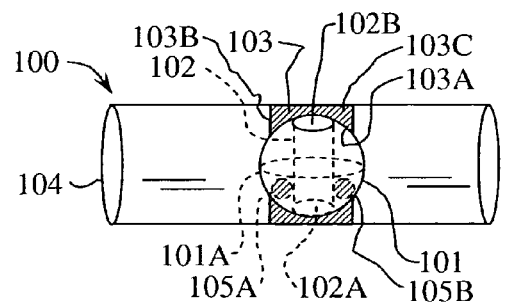
FIG. 1B is a diagrammatic cutaway perspective view of the flow control valve system of FIG. 1 showing a horizontally displaced occluded tubular conduit.
Figure 1C:
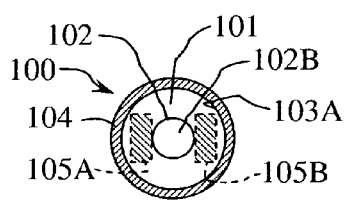
FIG. 1C is a diagrammatic top sectional view of the flow control valve system of FIG. 1 taken along section line 1C-1C.

Pendulous Control Valve System for Gas or Liquid or Light Beam—FIGS. 1-1C

FIG. 1 is a diagrammatic cutaway perspective view of a vertically orientated pendulous control valve system 100 having a rotatable, spherical, flow control valve 101. FIG. 1C is a diagrammatic top sectional view of the flow control valve system of FIG. 1 taken along section line 1C-1C in FIG. 1. FIGS. 1, 1C show a currently horizontal positioning for an equatorial plane and equatorial circumferential line 101A of control valve 101 within a tubular housing 104.

Flow control valve 101 is typically a super-slippery sphere made from or coated with a polytetraflouroethylene-graphite composite, or made from or coated with a similar super-slippery material such as polyethylene, or may also be a heavier slippery ball made of polymeric or cast phenolic resin, or be any other ball which provides a slick spherical surface. Control valve 101 has a provided longitudinal aperture, being a tubular conduit 102, molded into or drilled through a vertical diametrical axis 106 of control valve 101 (illustrated by a dash-dot two-way axial arrow line). Tubular conduit 102 is typically a cylindrical aperture, but may be otherwise shaped, and may also have a provided pressure-fit plastic or other material tube or lining. FIG. 1 shows tubular conduit 102 having a circular first end bottom opening 102A and a circular second end top opening 102B centered on the opposing respective ends of a vertical axial diameter 106. The open aperture of tubular conduit 102 is thus suitable for the passage of a gas or a liquid or a light beam flowing in either direction through control valve 101. The centered passage of axial arrow line 106 through the vertical centerline of tubular housing 104 indicates that control valve 101 is currently in an open valve state.

Control valve 101 is rotatably supported within a partially enclosing support cage, which is a spherically shaped interior surface 103A of a surrounding plastic or other material block support 103. Interior surface 103A is typically coated with equivalent super-slippery materials as cited above. Control valve 101 will typically be placed into vertically or horizontally separated halves of block support 103, with the opposing halves then snap-connected, or otherwise connected by adhesives, or by other connection methods to form a single support block. As shown in FIG. 1, block support 103 has an externally cylindrical form of a predetermined height less than the diameter of control valve 101, and has a top plane 103B and a bottom plane 103C, which planes are typically set perpendicular to the vertical walls of a housing such as housing tube 104. In FIG. 1, block support 103 is shown pressure fit into, or otherwise connective within open-ended cylindrical housing tube 104. A housing for a pendulous control system, such as tube 104, is typically made of plastic or any other suitable material of suitable thickness to maintain block support 103, top plane 103B, and bottom plane 103C in a fixed connective position within, and in a plane perpendicular to, the frictionally or otherwise connective inner wall surface of tube 104. Block support 103 may be of any suitable external shape which is appropriate for its housing, and housing tube 104 may be of any suitable shape for the flow purpose which it serves, and may alternately be a securely closed housing, or a detachably attachably capped housing which has a provided set of inlet and outlet apertures suitable for the flow of a gas or liquid or a light beam.

Control valve 101 is bottom weighted with a gravitationally responsive mass at a point below equatorial circumference line 101A to produce a pendulous effect for control valve 101 within caging block support 103, and more particularly, within its super-slippery spherical interior surface 103A. The weighting is done either with a single weight mass or with a plurality of weight masses, which are evenly distributed around first end bottom opening 102A of tubular conduit 102. In the example of FIGS. 1-1C, a set of laterally disposed, weighted masses in the form of cylindrical or otherwise shaped weights, being a first weight 105A, and a second weight 105B, made of lead or another heavier metal, are situated below equatorial circumference 101A of control valve 101, and are shown evenly distributed around bottom opening 102A. Weights 105A, 105B may be inserted into control valve 101 during its manufacture or inserted afterwards into suitably drilled apertures which are flush-filled to the curvature of control valve 101 before the super-slippery surface coating process is performed on valve 101.

Preferably, the overall mass of control valve 101 will be kept low relative to the mass of its bottom weight mass to enhance the effects of inertia on the bottom weight mass, and thus enhance the overall tendency of control valve 101 to resist rotation out of its normal rest state in a vertical orientation should block support 103 begin to rotate in any direction around control valve 101. Having a lower mass for control valve 101 will also enhance the tendency of the bottom weight mass of control valve 101 to restore itself to a vertical orientation in response to gravity should any rotation of control valve 101 occur.

FIG. 1A is a diagrammatic perspective view of control valve system 100 of FIG. 1 showing a left tilted, partially occluded tubular conduit 102. As valve system 100 is rotated in any direction, the inherent inertia and gravity responsive tendency of control valve 101 is to remain in or immediately return to a vertically orientated position within the super-slippery environs of interior surface 103A. Thus, as shown in FIG. 1A, as valve system 100 begins to rotate to the left, top opening 102A and bottom opening 102B of tubular conduit 102 are partially occluded against interior surface 103A. FIG. 1B illustrates the fully closed state of control valve 101 when valve system 100 is in a fully horizontal tilt position. As exemplified by FIGS. 1A-1B, once valve system 100 reaches a tilt angle predetermined by the specific inside diameter of conduit 102 in relation to the specific vertical sizing of block support 103, conduit 102 will be effectively closed to the passage of a gas or a liquid or a light beam.

In operation, control valve system 100 is typically aligned within a larger-order (but still small scale) system that conveys a gas, liquid or light beam through housing tube 104 and through tubular conduit 102. Within such a larger-order system, control valve 101 effectively functions as an on-off or cut-off gating valve whenever a tilt beyond a predetermined angle occurs.

If the larger-order system within which a gas or liquid or light beam flow control valve of the present invention is positioned requires that an alarm be activated, and/or the larger-order system be completely shut down once the flow control valve is tripped, various methods may be utilized to set off an alarm and/or to shut down the larger-order system. For example, an additionally provided electrical tilt switch, such as the types shown and explained in terms of the respective embodiments of FIGS. 2 and 3, may be added adjacent to the gas or liquid or light beam flow control valve position to detect a predetermined displacement from an upright orientation and used to set off an alarm and/or to disconnect the power source to the overall system.

Figure 2:
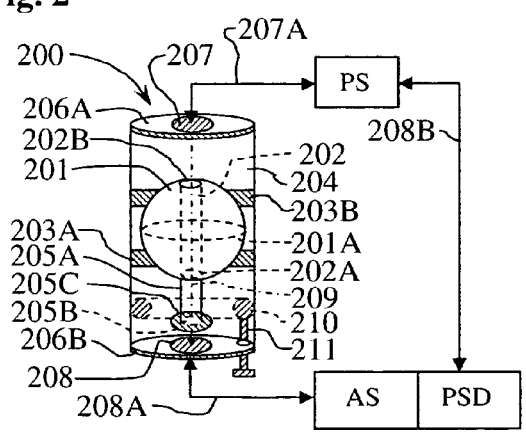
FIG. 2 is a diagrammatic cutaway perspective view of a vertically orientated flow control valve system for controlling a light beam wherein annular support rings and an external pendulous conduit are utilized.

Pendulous Control Valve System for Electromagnetic Beam Flow—FIG. 2

It is relatively simple to envision control valve system 100 connective within a larger order gas or liquid flow system wherein control valve 101 is utilized. For example, for controlling gas flow, control valve 101 may be placed adjacent to the top end of a tubular diving snorkel to control airflow and prevent water introduction when the snorkel is tipped. Or, for example, for controlling liquid flow, control valve 101 may be placed within the fill tube of a portable liquid supply container to serve as a shut-off valve in the event that the container is tipped over while uncapped. A clearer example of utilizing a control valve system of the invention for controlling the flow of an electromagnetic beam flow 209 is shown in FIG. 2. Where not stated otherwise, elements equivalent to those discussed above are made of the same materials and connective in the same ways indicated above.

FIG. 2 is a diagrammatic, cutaway perspective view of a vertically orientated pendulous light beam control valve system 200 for controlling the flow of an electromagnetic beam, for example, a laser beam or a light beam from a Light Emitting Diode (LED). Light beam control valve system 200 has a non-weighted, rotatable spherical control valve 201 of the material type cited for the embodiment of FIG. 1. Control valve 201 has a narrowed tubular conduit 202 having a circular top opening 202B and a circular bottom opening 202A through which an extended tubular pendulum 205A with a bottom aperture 205B has been pressure fitted. Pendulum 205A extends out from the bottom of valve 201 to a predetermined length where it has a toroidal common or magnetic metal weight 205C which is pressure fitted or otherwise made connective adjacent to the distal end of pendulum 205A. Control valve 201 is rotatably supported within a cage formed by a lower annular rotatable bearing support or a super-slippery slide ring, being lower annular support 203A, and an equivalent upper annular caging support, being an upper annular support 203B. Lower annular support 203A is first pressure fit into housing 204, and then control valve 201 is set upon support 203A with pendulum 205A being downwardly disposed. Upper annular support 205B is then pressure fit into cylindrical housing tube 204 just sufficiently to allow control valve 201 to freely rotate within the thus provided cage. Annular supports 203A, 203B are sufficient as caging supports in light beam control valve system 200 because it is unnecessary to fully occlude tubular conduit 202 to interrupt the flow of a light beam being conveyed through tubular conduit 202. Simply tilting control valve system 200 will cause weighted pendulous conduit 205A, and so control valve 201, and thus tubular conduit 202 to fall out of alignment with housing tube 204 and thus prevent a passage of the light flow.

Light control valve system 200 has a plastic top cover 206A and a plastic bottom cover 206B pressure fitted over housing tube 204. Top cover 206A and bottom cover 206B have been respectively provided with suitable, centralized, inlet-outlet mounting apertures (hidden, not shown) into tube 204 for the respective pressure fit mounting of a top LED (Light Emitting Diode) 207 and a bottom photoelectric cell 208. Top LED 207 is shown wire-connected by an I/O wire cable 207A to a power source such as a battery, represented in FIG. 2 by a boxed-in "PS." Bottom photoelectric cell 208 is shown wire-connected by an I/O wire cable 208A to an electrically operated alarm system of the type that is triggered by circuit interruption, represented in FIG. 2 by a boxed-in "AS."

In use, power source PS is made electrically connective with LED 207 via I/O wire 207A causing LED 207 to emit a light beam 209 (shown as a vertical dash-dot arrow line) which travels downward through top conduit opening 202B, through conduit 202, and out bottom conduit opening 202A, and thence through and out of pendulum 205A, where beam 209 then strikes photocell 208. Any tilting of control valve system 200 beyond a predetermined angle will cause light beam 209 to be interrupted, thus causing a loss of current flowing through photocell 208 and triggering alarm system AS to be activated.

FIG. 2 also shows a cooperatively attractive metal catch ring 210 used for capturing pendulum weight 205C, if a magnetic weight mass is utilized, whenever pendulum 205A tilts sufficiently to position weight 205C against catch ring 210. Alternately, catch ring 210 may be further provided either with a manually operated hinged, or manually operated spring-biased, or electric solenoid-operated catch ring release mechanism, being ring release 211 for magnetic weight 205C if light control valve system 200 is to be utilized for more than one magnetic locking sequence.

If the larger-order system employing a light beam control valve system 200 requires that the larger-order power source system be completely shut down once the flow control valve is tripped, a light beam control valve system 200 may be additionally provided with and made connective to a power source disconnect system, represented in FIG. 2 by a boxed-in "PSD," which is further wired-connected by an I/O wire 208B to power source PS to operate a disconnect switching system connective with power source PS.

Figure 3:
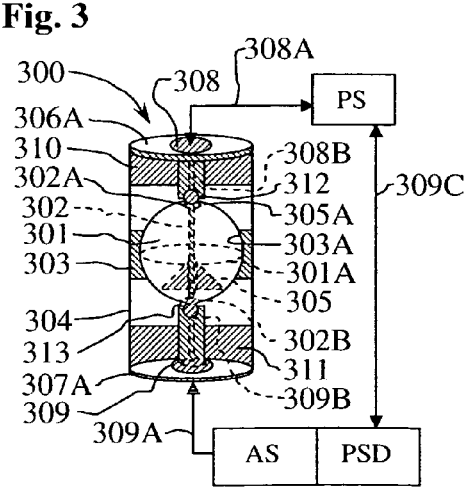
FIG. 3 is a diagrammatic cutaway perspective view of a vertically orientated control valve system for controlling an electric current.

Pendulous Control Valve System for Electric Current—FIG. 3

In addition to functioning as an on-off tilt valve for gas, liquid or light, alternate embodiments of the control valve system of FIGS. 1-1C can be utilized as a control valve for the flow of an electric current. In such a modified embodiment, a tubular conduit would be further provided with, or replaced by, an electrically conductive material so that a current passing through the conductive material, and thus through a control valve of the type being discussed, would be interrupted whenever the control valve system is tilted beyond a predetermined angle. A clearer example of utilizing a control valve system of the invention for controlling the flow of an electric current is shown in FIG. 3. Where not stated otherwise, elements equivalent to those discussed above are made of the same materials and connective in the same ways.

FIG. 3 is a diagrammatic cutaway perspective view of a vertically-orientated pendulous control valve system 300 for controlling an electric current. Electric current control valve system 300 has a rotatable, non-conductive, spherical control valve 301, having an internal conical metal bottom weight mass 305 positioned below an equatorial circumference line 301A, and has a shortened cage support block 303 with a spherically-shaped interior surface 303A. Control valve 301 also has an electrically conductive material, for example, a metal rod conduit 302 insertably positioned within a provided aperture through its vertical diametrical axis. Rod conduit 302 has a top-mounted, electrically-conductive cap 302A and a bottom-mounted electrically-conductive cap 302B. Caps 302A, 302B may be made to either respectively match the curvature of control valve 301 as flush caps, or may be made as protruding caps which are respectively pressure fit into suitably provided circular recesses in control valve 301, or otherwise made physically and electrically connective with rod conduit 302. Electric current control valve system 300 has a shortened housing in the form of a cylindrical housing tube 304 into which the above elements have been set in the manner previously discussed. As shown in FIG. 3, support block 303 is of a reduced height, and thus, as noted above, caps 302A, 302B may be allowed to slightly protrude in electric current control valve system 300 because it is unnecessary to rotate rod conduit 302 to a point within interior surface 303A of block support 303 in order to interrupt the provided circuit connection further explained below.

Housing tube 304 has a plastic top cover 306A and a plastic bottom cover 307A pressure fit over tube 304. Top cover 306A and bottom cover 307A have been respectively provided with suitable mounting apertures (hidden, not shown) for the respective pressure-fit mounting of a top electric inlet plug 308 and a bottom electric outlet plug 309. Top plug 308 is shown wire-connected by an I/O wire cable 308A to a power source, such as a battery, represented by a boxed-in "PS." Bottom outlet plug 309 is shown wire-connected by an I/O wire cable 309A to an electrically operated alarm system of the type that is triggered by circuit interruption, represented in FIG. 3 by a boxed-in "AS."

Top electric inlet plug 308 and bottom electric outlet plug 309 respectively have axially extended conductive rods, a top rod 308B, and a bottom rod 309B, which pass through apertures (hidden, not shown) within an upper block support 310 and a lower block support 311 respectively situated just above and just below control valve 301 and pressure fit into housing tube 304. Rods 308B, 309B respectively terminate in either rotatable-ball, spring-loaded electrically conductive contacts, or in curved electrically conductive slide contacts, or in any other suitable electrically conductive contacts, being an upper electrical contact 312, and a lower electric contact 313, which ride above or against the surface of control valve 301 as dependent on whether or not rod caps 302A, 302B have been made flush with control valve 301 or if they protrude above the surface of control valve 301 to electrically mate with upper electrical contact 312, and lower electric contact 313 when control valve system 300 is in a vertical position.

In use, any tilting of electric current control valve system 300 beyond a predetermined angle will cause control valve 301 and its associated electrical connections to be rotated out of a vertically aligned connective circuit state, i.e. the electric current from power source PS will be interrupted causing a loss of current flowing through outlet plug 309 and triggering alarm system AS to be actuated.

As shown in the example of the light control embodiment of FIG. 2, electric current control valve system 300 may be alternately provided with a pendulous, elongated conduit, with the exception that in the alternate embodiment of electric current control valve system 300 the elongated conduit would be rigid and contain a conductive material having a first end with a conductive cap equivalent to cap 302A and a second end with a conductive cap equivalent to cap 302B which extends through rotatable spherical valve 301 to a predetermined point external to valve 301 and which has a gravitationally responsive weight mass distributed around its distal end. Such an alternately provided pendulous, elongated rigid conduit containing a conductive material may also have a gravitationally responsive magnetic mass equivalent to toroidal mass 205C shown in FIG. 2, distributed around its distal end, which is cooperatively attractive with a further provided metal ring, equivalent to metal ring 210 shown in FIG. 2, within housing tube 304. A provided metal catch ring may also then be provided with a catch release mechanism equivalent to ring release 211 in FIG. 2.

Alternately, conductive rod conduit 302 may be replaced by any suitable form of flush-fitting conductive ring conduit circumferentially or semi-circumferentially encompassing control valve 301 to provide a conductive path for electric current between top cap 302A and bottom cap 302B. In terms of FIG. 3, such a circumferential ring conduit would be a vertically orientated geometric equivalent of the circular (dash) line around equatorial circumference line 301A.

If the larger-order system employing an electric current control valve system 300 requires that the larger-order system be completely shut down once the flow control valve is tripped, an electric current control valve system 300 may be additionally provided with and made connective to a power source disconnect system, represented in FIG. 3 by a boxed-in "PSD," which is further wired-connected by an I/O wire 309C to power source PS to operate a disconnect switching system within power source PS.

CONCLUSIONS, RAMIFICATIONS, AND SCOPE

In a Pendulous Control Valve System of the types under discussion, a housing need not be merely a simple cylindrical tube such as has been shown in the appended drawings for the purposes of example. A housing may as well be any appropriate containment structure suitable for securely or detachably attachably containing the essential elements of the system, such as a rectangular parallelepiped (box-like) or elliptical-cylinder shaped housing, or any other geometrically suitable form of housing for the type of Pendulous Control Valve System being utilized within a larger-order flow system application. Similarly, an inlet and outlet method for a housing need not be confined to a simple open-ended cylindrical tube, but may be a more complex arrangement of inlet and outlet nipples or connective tubing or any other such method for allowing a flow into and out from a housing. Also, a spherical control valve, i.e. a ball-type valve, need not be completely spherical, but may in some types of Pendulous Control Valve Systems, be of a truncated type, or may be multiply truncated up to a disk-like form with a rounded edge, or be of a half-ball design, which sufficiently rotates within a suitable support means to interrupt the flow of an electromagnetic beam or an electric current embodiment of the invention. A spherical ball, or by inference, its several forms as just described, may be bottom-weighted in a manner distinct from those shown as examples in the drawings, for example, a control valve may be provided with a solid mass other than metal such as a clay or rock, or other heavier material, or may be induced into restoring itself to a vertical position by means other than a bottom weight, or a pendulum weight, for example by means of an elastic string or band, or the like, suitably attached to the central bottom region of a control valve to maintain it in a vertical orientation and to restore it to a vertical orientation whenever it may be displaced. And also, in a Pendulous Control Valve System of the types under discussion, a rotatable support system for a rotatably confined spherical valve may be otherwise than shown as a support block with an interior spherically shaped surface, or rotatable bearings or super-slippery slide supports. For example, a rotatable spherical valve may have a magnetically or electromagnetically confined housing support system, or may be otherwise positioned within a housing while suspended in a suitable fluid floating arrangement, or may be fashioned into a ball and socket arrangement that allows a control valve its required rotation.

In a Pendulous Control Valve System of the types under discussion, increased tilt angles before occlusion of a vertical aperture may be attained in a gas or liquid flow embodiment by increasing the inlet diameter of the vertical diametrical aperture, for example, by altering the aperture from a cylindrical to a funnel shape and thus increasing the travel distance for the inlet opening before complete closure will occur within a support block. Similarly, increasing the top cap size in an electric current embodiment, or widening the overall diameter of a uniform aperture for an electromagnetic beam embodiment will produce an equivalent increased tilt angle effect. Conversely, narrowing the diametrical aperture opening or top cap will decrease the rotational travel distance required to occlude a flow and thus increase the sensitivity of a Pendulous Control Valve System. Furthermore, a diametrical conduit for a spherical valve being used for a Pendulous Control Valve System of the types under discussion may be otherwise sized or shaped than has thus far been shown and described, and, for example, may be of the funnel shape noted above, or be of a differing geometric form, such as having triangular, rectangular or octagonal or other shaped side walls, or may be extended above or below the control valve to better suit the application for which the control valve system is being utilized. Changing the lateral sizing of a pendulum weight in a Pendulous Control Valve System of the types under discussion also changes the possible sweep angle of the pendulum prior to striking against the enclosing walls of the housing, or if a magnetic weight is provided, prior to making connection with a surrounding catch ring or its functional equivalent, thus limiting the possible angle of rotation of the spherical control valve within a specific conical size.

Alternately, a flow occlusion alarm and/or a circuit interruption type of power source disconnect switching system may be provided for a flow control valve of the invention through the use of provided indicia on a ball which are cooperatively utilized in conjunction with an optical detection method, e.g. an optical detection method equivalent to a computer pointer optical ball sensor, to detect predetermined angles of rotation and thereafter utilize a circuit interruption method to serve as a power disconnect method for the overall larger-order system in which a Pendulous Control Valve system is placed, or for that portion of the overall system wherein a Pendulous Control Valve system is positioned.

Some of the problematic issues with a Pendulous Control Valve System of the types under discussion are similar to the problems that would be encountered with a similar type of rotating, caged-ball control system such as a computer mouse with a rotatable-ball pointer controller. There is always the possibility of introducing contaminants such as dust, dirt, hair or other debris onto the ball and possibly inhibiting its intended operation. Likewise, if a control valve is utilized within a high pressure flow system there is always the possibility of encountering flow leakage around the spherical valve if the manufacturing tolerances are less than perfect. Pressure related effects can also cause unwanted lower area friction against the valve, possibly causing it to rotate erratically or bind within its rotational support device. And, in an electrical flow system, there is always the possibility of electrical arcing and the pitting of the contact points on the spherical valve.

The contamination issues mentioned can be generally resolved by utilizing replaceable or washable fiber or metal media inlet systems to filter out debris before it can affect the rotational abilities of a control valve. Most of the other cited problematic issues can be generally resolved by avoiding high pressure, or high current value, large scale applications for the various Pendulous Control Valve System embodiments.

Providing an extended pendulum with a heavier weight mass will increase the overall leverage for rotation of a pendulous control valve to better resolve the issue of unexpected high pressure gas or liquid flow which might otherwise inhibit or bind a control valve by exerting undue force against the ball in its caging support. A pendulum-levered, heavier weight mass supplementing, or acting in lieu of the limited-leverage internal weight mass of a control valve can assist to overcome the induced friction of a control valve against its rotatable support. With such an increased pendulum weight method an upper ring seal for the control valve may be introduced into the system to better control the possibility of any conveyed gas or liquid material flowing around a control valve. Also, utilizing a central funneling device over the top aperture of a control valve can better direct the flow of a gas or liquid through the control valve. A Pendulous Control Valve System would not normally be used with a high viscous fluid or with any granularly flowing material such as sand.

For clarity, since gas or liquid or light or electric current can travel either way through a control valve, a control valve without some form of locking action such as a provided pendulum with a magnetic locking ring mechanism would not be used for vehicle or other equipment rollover purposes since in the absence of such a locking mechanism a flow would continue through the control valve once the control valve were fully inverted if not locked in a closed position. Other control methods may also be introduced into the various Pendulous Control Valve System embodiments which would better serve to maintain the action of the overall mechanism. For example, in a liquid flow system where liquid may possibly be introduced past a control valve and pool in a lower chamber of the device, a purging valve or purging system could be provided.

There are numerous practical uses for the various embodiments of a Pendulous Control Valve System, and the following lists of examples are by no means complete. A gas or liquid flow-controlling embodiment may be used to provide a control valve method in association with a dry snorkel, or for a float-supported snorkel having an extended air hose for underwater breathing purposes; or, may be used as a tip-over or rollover gas or liquid flow cut-off means for any low pressure, small scale containment device. An electromagnetic beam or an electric current flow-controlling embodiment may be used to provide a control valve method in association with a tip-over or roll-over safety cut-off switch for a power tool, or a space heater, or a vehicle or other equipment electrical systems; or, may be used as a multi-directional motion detector for sensing shock vibrations imparted to an object to which the control valve is rigidly secured, i.e. the device may be used virtually anywhere to detect inertial changes (where the control valve rocks or rotates and the cage support remains stationary) to trigger intrusion or catastrophe alarm systems or other devices; or, may be used with gravitational responses as a turn-on switch for an uplifted automotive under-hood or under-rear-deck light system; or may be used with inertial responses as a drawer or door turn-on light switch; or, or may be used in a plumb or level measuring system, or in a rocking pedometer system, or other rocking or partially rotating electrical systems, e.g. as a pin ball tilt switch.

Essence of the Invention

The essence of the invention as Pendulous Control Valve System is that it comprises a housing having an inlet and an outlet, and a rotatable spherical valve having a diametrical conduit having a first end and a second end and having an internal or external gravitationally responsive mass distributed around a portion of the first end of the diametrical conduit within the rotatable spherical valve, and a substantially enclosing support system for the rotatable spherical valve connective within the housing suitable for allowing the rotatable spherical valve to rotate and suitable for occluding or disconnecting the second end of the diametrical conduit when the diametrical conduit within the rotatable spherical valve has been rotated to a position within the substantially enclosing support where occlusion or disconnection of the second end can occur, whereby, flowable material or energy forms may only be conveyed through the inlet and the outlet of the housing when the internal or external gravitationally responsive mass has rotated the diametrical conduit within the rotatable spherical valve to a rotational position approximately perpendicular to the horizontal plane of the support.

What is new and significant about the present invention is that the various embodiments provide a multifunctional pendulous flow-control valve system, which may be employed within a variety of small scale systems that require a tilt-responsive on-off device that allows or prevents the flow of a low pressure gas or liquid, or which require a flow control valve that permits or interrupts the flow of an electromagnetic beam or an electrical current. The several embodiments described above are only illustrative examples of the present invention and it should not be construed that the present invention is limited to those particular embodiments. Various changes and modifications in alternate embodiments of the present invention, as noted above or as may be determined in the future, may be effected by one skilled in the art to which the invention relates without departing from the spirit or scope of the present invention as defined in the appended claims.

I claim:

1. A pendulous control valve system comprising:
   a. a housing means having an inlet means and an outlet means, and
   b. a rotatable spherical valve having a diametrical conduit having a first end and a second end and having an internal gravitationally responsive mass distributed around a portion of said first end of said diametrical conduit within said rotatable spherical valve, and
   c. a substantially enclosing support means for said rotatable spherical valve connective within said housing means suitable for allowing said rotatable spherical valve to rotate and suitable for occluding said second end of said diametrical conduit when said diametrical conduit within said rotatable spherical valve has been rotated to a position within said substantially enclosing support means where occlusion of said second end can occur,
   whereby, flowable mass or energy may only be conveyed through said inlet means and said outlet means of said housing means when said internal gravitationally responsive mass has rotated said diametrical conduit within said rotatable spherical valve to a rotational position approximately perpendicular to the horizontal plane of said substantially enclosing support means.

2. A pendulous control valve system according to claim 1, wherein said flowable mass is a gas or a liquid.

3. A pendulous control valve system according to claim 1, wherein said flowable energy is an electromagnetic beam.

4. A pendulous control valve system according to claim 1, wherein said internal gravitationally responsive mass is a plurality of gravitationally responsive masses.

5. A pendulous control valve system according to claim 1, further comprising an elongated downwardly disposed conduit connective with said diametrical conduit.

6. A pendulous control valve system according to claim 1, further comprising an elongated downwardly disposed conduit connective with said diametrical conduit further having a gravitationally responsive mass distributed around a portion of its distal end.

7. A pendulous control valve system according to claim 1, further comprising an elongated downwardly disposed conduit connective with said diametrical conduit further having a gravitationally responsive magnetic mass distributed around a portion of its distal end which is cooperatively attractive with a further provided metal ring within said housing means.

8. A pendulous control valve system according to claim 1, further including an alarm system and/or a power source disconnect system.

9. A pendulous control valve system according to claim 1, wherein said substantially enclosing support means is selected from a group comprised of rotatable bearings, or ring slides, or a support block, with a slippery spherical interior surface.

10. A pendulous control valve system comprising:
   a. a housing means having an inlet means and an outlet means, and
   b. a rotatable spherical valve having a diametrical conduit having a first end and a second end, and
   c. an elongated downwardly disposed conduit connective with said first end of said diametrical conduit further having a gravitationally responsive mass distributed around its distal end, and
   d. a substantially enclosing support means for said rotatable spherical valve connective within said housing means suitable for allowing said rotatable spherical valve to rotate and suitable for occluding said second end of said diametrical conduit when said diametrical conduit within said rotatable spherical valve has been rotated to a position within said substantially enclosing support means where occlusion of said second end can occur,
   whereby, flowable mass or energy may only be conveyed through said inlet means and said outlet means of said housing means when said elongated downwardly disposed conduit further having a gravitationally responsive mass distributed around its distal end has rotated said diametrical conduit within said rotatable spherical valve to a rotational position approximately perpendicular to the horizontal plane of said substantially enclosing support means.

11. A pendulous control valve system according to claim 10, wherein said flowable mass is a gas or a liquid.

12. A pendulous control valve system according to claim 10, wherein said flowable energy is an electromagnetic beam.

13. A pendulous control valve system according to claim 10, wherein said substantially enclosing support means is selected from a group comprised of rotatable bearings, or ring slides, or a support block, with a slippery spherical interior surface.

14. A pendulous control valve system according to claim 10, further including an alarm system and/or a power source disconnect system.

\* \* \* \* \*